United States Patent
Watanabe et al.

(10) Patent No.: US 10,930,952 B2
(45) Date of Patent: Feb. 23, 2021

(54) FUEL CELL SYSTEM, MOVING OBJECT INCLUDING FUEL CELL SYSTEM, AND WIND SPEED DERIVING METHOD IN FUEL CELL SYSTEM

(71) Applicant: TOYOTA JIDOSHA KABUSHIKI KAISHA, Toyota (JP)

(72) Inventors: Satoshi Watanabe, Okazaki (JP); Satoshi Shiokawa, Okazaki (JP); Shuhei Nakamura, Miyoshi (JP); Norihiro Fukaya, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 25 days.

(21) Appl. No.: 16/286,915

(22) Filed: Feb. 27, 2019

(65) Prior Publication Data
US 2019/0273273 A1  Sep. 5, 2019

(30) Foreign Application Priority Data

Mar. 2, 2018 (JP) .............................. JP2018-037317

(51) Int. Cl.
| | | |
|---|---|---|
| *H01M 8/04* | (2016.01) | |
| *H01M 8/0438* | (2016.01) | |
| *H01M 8/04111* | (2016.01) | |
| *H01M 8/04082* | (2016.01) | |
| *H01M 8/0432* | (2016.01) | |
| *H01M 8/04858* | (2016.01) | |
| *B60L 50/72* | (2019.01) | |
| *B60L 50/71* | (2019.01) | |
| *H01M 8/04119* | (2016.01) | |

(52) U.S. Cl.
CPC ......... *H01M 8/04395* (2013.01); *B60L 50/71* (2019.02); *B60L 50/72* (2019.02); *H01M 8/0432* (2013.01); *H01M 8/04111* (2013.01); *H01M 8/04164* (2013.01); *H01M 8/04201* (2013.01); *H01M 8/04932* (2013.01); *H01M 2250/20* (2013.01)

(58) Field of Classification Search
CPC ......... H01M 8/04395; H01M 8/04111; H01M 8/04164; H01M 8/04201
See application file for complete search history.

(56) References Cited

U.S. PATENT DOCUMENTS

| | | |
|---|---|---|
| 2009/0258277 A1 | 10/2009 | Fujita |
| 2017/0104231 A1 | 4/2017 | Jomori |

FOREIGN PATENT DOCUMENTS

| | | | |
|---|---|---|---|
| JP | 2007-157432 | A | 6/2007 |
| JP | 2008-123930 | A | 5/2008 |
| JP | 2012-060784 | A | 3/2012 |
| JP | 2014-183676 | A | 9/2014 |
| JP | 2016-210382 | A | 12/2016 |
| JP | 2017-073376 | A | 4/2017 |

*Primary Examiner* — Olatunji A Godo
(74) *Attorney, Agent, or Firm* — Dickinson Wright PLLC

(57) ABSTRACT

A fuel cell system includes: a flow sensor configured to measure an actual flow rate of air which is introduced into an oxidizing gas supply passage via a compressor when a fuel cell generates electric power; and a wind speed deriving unit configured to acquire a flow rate of air measured by the flow sensor in a state in which air flows from the oxidizing gas supply passage to an oxidizing gas discharge passage via the compressor and a bypass flow passage and to derive an actual wind speed of wind which is received by the fuel cell system, when the compressor stops.

13 Claims, 5 Drawing Sheets

FUEL CELL SYSTEM, MOVING OBJECT INCLUDING FUEL CELL SYSTEM, AND WIND SPEED DERIVING METHOD IN FUEL CELL SYSTEM

INCORPORATION BY REFERENCE

The disclosure of Japanese Patent Application No. 2018-037317 filed on Mar. 2, 2018 including the specification, drawings and abstract is incorporated herein by reference in its entirety.

BACKGROUND

1. Technical Field

The disclosure relates to a fuel cell system, a moving object including a fuel cell system, and a wind speed deriving method in a fuel cell system.

2. Description of Related Art

As control which is performed in a fuel cell system, control for determining whether an antifreezing operation is to be performed in a target pipe which is a pipe included in a fuel cell system by measuring a temperature of the target pipe or an outside air temperature and comparing the measured temperature with a threshold value is known (for example, see Japanese Unexamined Patent Application Publication No. 2007-157432 (JP 2007-157432 A)).

SUMMARY

In such control, when a temperature of a target pipe is directly measured, an influence of change in temperature of the pipe due to wind on the control can be curbed. However, since a temperature sensor needs to be provided for each target pipe, it is difficult to employ such a configuration because the number of components and the cost increase. On the other hand, when an outside air temperature is measured to acquire a temperature of a target pipe, a temperature sensor does not need to be separately provided in the pipe, but since the temperature of the pipe may change due to an influence of wind, there is a likelihood that detection accuracy of the temperature of the pipe will be insufficient. The problem with a decrease in temperature detection accuracy due to wind can be resolved by measuring a wind speed, which is difficult to employ because installation of a wind gauge can cause complication of a structure of the fuel cell system and an increase in cost. Accordingly, there is demand for a technique capable of detecting a wind speed of wind which is received by a fuel cell system without causing complication of a structure.

According to a first aspect of the disclosure, there is provided a fuel cell system including: a fuel cell; an oxidizing gas supply passage that is connected to the fuel cell and in which air supplied to the fuel cell flows; an oxidizing gas discharge passage that is connected to the fuel cell and in which an oxidizing exhaust gas discharged from the fuel cell flows; a compressor that is provided in the oxidizing gas supply passage and is configured to discharge air to the fuel cell, an upstream portion of the oxidizing gas supply passage and a downstream portion of the oxidizing gas supply passage communicating with each other via the compressor when the compressor stops, the upstream portion being upstream of the compressor and the downstream portion being downstream of the compressor; a bypass flow passage that connects a portion downstream from a position at which the compressor is disposed in the oxidizing gas supply passage to the oxidizing gas discharge passage; a flow sensor configured to measure an actual flow rate of air which is introduced into the oxidizing gas supply passage via the compressor when the fuel cell generates electric power; and a wind speed deriving unit configured to acquire the measured actual flow rate of air in a state in which air flows from the oxidizing gas supply passage to the oxidizing gas discharge passage via the compressor and the bypass flow passage and to derive an actual wind speed of wind which is received by the fuel cell system, when the compressor stops. With the fuel cell system according to this aspect, it is possible to derive an actual wind speed of wind which is received by the fuel cell system by acquiring a measured actual flow rate of air flowing from the oxidizing gas supply passage to the oxidizing gas discharge passage via the compressor and the bypass flow passage when the compressor stops. Accordingly, it is possible to derive an actual wind speed of wind which is received by the fuel cell system without complicating the structure by providing a separate wind speed sensor.

The fuel cell system according to the first aspect may further include a storage unit which stores, in advance, a relationship between a flow rate of air flowing from the oxidizing gas supply passage to the oxidizing gas discharge passage via the compressor and the bypass flow passage when the compressor stops and a wind speed of wind which is received by the fuel cell system. The wind speed deriving unit may be configured to derive the actual wind speed of wind which is received by the fuel cell system using the acquired measured actual flow rate of air and the stored relationship. With the fuel cell system having this configuration, it is possible to further enhance accuracy for deriving an actual wind speed of wind which is received by the fuel cell system.

The fuel cell system according to the first aspect may further include: a temperature deriving unit configured to derive a temperature of a constituent unit of the fuel cell system using the derived actual wind speed; and a retention suppressing unit configured to perform a process of suppressing a retention of liquid water in the constituent unit using the derived temperature of the constituent unit. With the fuel cell system having this configuration, it is possible to accurately derive a temperature of a constituent unit and to appropriately perform a process of suppressing a retention of liquid water in the constituent unit without complicating the structure.

In the fuel cell system according to the aspect, the compressor may be a turbo compressor. With the fuel cell system having this configuration, it is possible to easily cause an upstream portion and a downstream portion of the oxidizing gas supply passage connected to the compressor to communicate with each other via the compressor when the compressor stops.

The fuel cell system according to the first aspect may further include: a bypass valve that is disposed in the bypass flow passage; a shutoff valve that is disposed in the oxidizing gas supply passage at a position downstream from a connection part at which the bypass flow passage is connected to the oxidizing gas supply passage and is able to cut off a flow of air into the fuel cell; and a flow passage control unit configured to close the shutoff valve to cut off flow of air into the fuel cell and to open the bypass valve such that the air flows in the bypass flow passage, when the wind speed deriving unit derives the actual wind speed. With the fuel cell system having this configuration, it is possible to curb an influence of a pressure loss in a flow passage of an oxidizing gas in the fuel cell and to derive a wind speed of wind which is received by the fuel cell system when the compressor stops.

According to a second aspect of the disclosure, there is provided a moving object including the fuel cell system according to the first aspect. The moving object may be a fuel cell vehicle. The fuel cell system may be disposed in a front compartment of the fuel cell vehicle.

According to a third aspect of the disclosure, there is provided a wind speed deriving method in a fuel cell system including a fuel cell. The wind speed deriving method includes: causing at least a part of air flowing in a compressor to bypass the fuel cell and measuring an actual flow rate of air flowing in the compressor, when the compressor that supplies air as an oxidizing gas to the fuel cell stops; and deriving an actual wind speed of wind which is received by the fuel cell system using a relationship between a flow rate of air flowing in the compressor when the compressor stops and the wind speed of wind which is received by the fuel cell system which is stored in advance in a storage unit and the measured actual flow rate of air.

The disclosure can be embodied in various forms other than those described above and can be embodied, for example, in a form of a method of deriving a temperature of a constituent unit of a fuel cell system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. Configuration of Fuel Cell System

Figure 1:
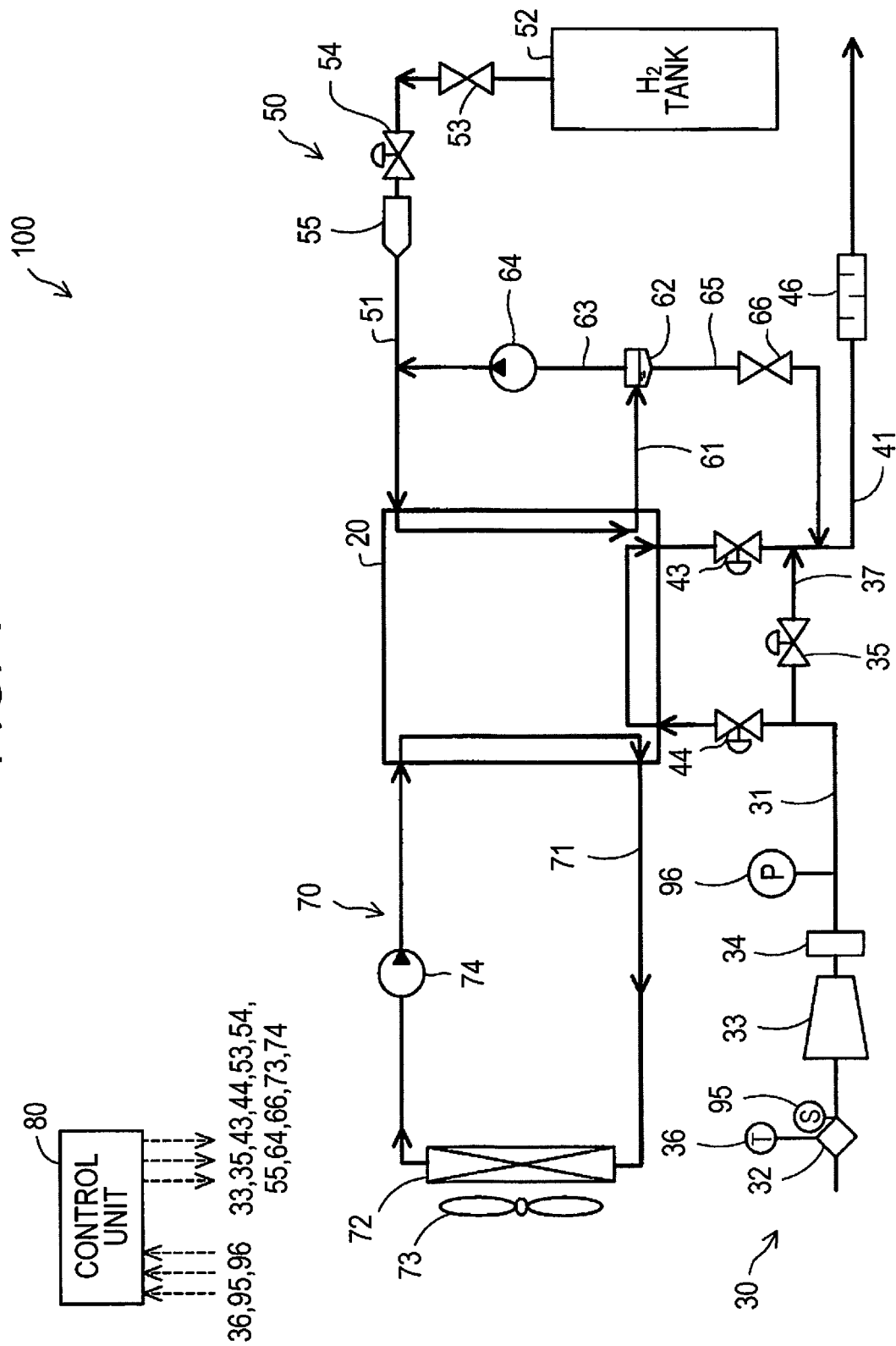
FIG. 1 is a diagram schematically illustrating a configuration of a fuel cell system.

FIG. 1 is a diagram schematically illustrating a configuration of a fuel cell system 100 according to a first embodiment of the disclosure. The fuel cell system 100 according to this embodiment is mounted in an electric vehicle and is used as a driving power source. The fuel cell system 100 according to this embodiment includes a fuel cell 20, a fuel gas system 50, an oxidizing gas system 30, a refrigerant system 70, and a control unit 80.

The fuel cell 20 has a stacked structure in which a plurality of single cells are stacked and generates electric power with supply of a fuel gas containing hydrogen and an oxidizing gas containing oxygen. The fuel cell 20 according to this embodiment is a solid polymer type fuel cell. In each single cell constituting the fuel cell 20, a flow passage (an anode-side flow passage) in which a fuel gas flows is formed on an anode side and a flow passage (a cathode-side flow passage) in which an oxidizing gas flows is formed on a cathode side, with an electrolyte membrane interposed therebetween. A refrigerant passage in which a refrigerant for cooling the fuel cell 20 flows is formed in the fuel cell 20. The fuel cell 20 is not limited to a solid polymer type fuel cell, and other fuel cells such as a solid oxide type fuel cell may be employed.

The fuel gas system 50 includes a hydrogen tank 52, a fuel gas supply passage 51, a fuel gas discharge passage 61, a fuel gas circulation passage 63, a main stop valve 53, a variable pressure control valve 54, an injector 55, a gas-liquid separator 62, and a fuel gas pump 64. The hydrogen tank 52 is a storage device in which hydrogen gas is stored as fuel gas. The hydrogen gas stored in the hydrogen tank 52 passes through the main stop valve 53, is then decompressed by the variable pressure control valve 54, and is supplied to the fuel gas supply passage 51 connected to a cell fuel gas passage of the fuel cell 20 via the injector 55. The fuel gas supply passage 51, the fuel gas discharge passage 61, and the fuel gas circulation passage 63 are collectively referred to as a fuel gas passage.

The fuel gas discharge passage 61 is a flow passage in which a fuel exhaust gas discharged from the fuel cell 20 flows. The fuel gas circulation passage 63 is connected to the fuel gas discharge passage 61 and a part downstream from the injector 55 in the fuel gas supply passage 51 and recirculates the fuel exhaust gas to the fuel gas supply passage 51. That is, the fuel exhaust gas discharged from the fuel cell 20 to the fuel gas discharge passage 61 is guided again to the fuel gas supply passage 51 via the fuel gas circulation passage 63. Accordingly, in the fuel cell system 100, a fuel gas circulates in the fuel gas discharge passage 61, the fuel gas circulation passage 63, a part of the fuel gas supply passage 51, and a fuel gas passage formed in the fuel cell 20 while hydrogen therein is consumed by generation of electric power. A fuel gas pump 64 that generates a driving force for causing the fuel exhaust gas to flow into the fuel gas supply passage 51 is provided in the fuel gas circulation passage 63.

The gas-liquid separator 62 is provided in a connection part between the fuel gas discharge passage 61 and the fuel gas circulation passage 63. The fuel exhaust gas includes impurities such as nitrogen or water vapor along with hydrogen which has not been consumed during generation of electric power. The gas-liquid separator 62 separates water from the fuel exhaust gas including gas such as hydrogen and nitrogen. A fuel gas release passage 65 including a purge valve 66 is connected to the gas-liquid separator 62, and water and gas are discharged from the gas-liquid separator 62 by opening the purge valve 66.

The oxidizing gas system 30 includes an air cleaner 32, an air compressor 33, an intercooler 34, an oxidizing gas supply passage 31, an oxidizing gas discharge passage 41, a bypass flow passage 37, an outside air temperature sensor 36, an air flowmeter 95, a pressure sensor 96, an ON-OFF valve 44, a control valve 43, a bypass valve 35, and a muffler 46. The fuel cell system 100 according to this embodiment uses air as an oxidizing gas.

In the oxidizing gas supply passage 31, the air cleaner 32, the air compressor 33, the intercooler 34, the pressure sensor 96, and the ON-OFF valve 44 are arranged in that order from upstream. The air cleaner 32 removes foreign substance such as dust from air taken in the oxidizing gas supply passage 31 in the vicinity of an intake port of the oxidizing gas supply passage 31. The air flowmeter 95 that measures a flow rate of air passing through the air cleaner 32 and the outside air temperature sensor 36 are provided in the vicinity of the air cleaner 32. The air flowmeter 95 is used to measure an amount of air which is actually supplied to the fuel cell 20 when feedback control for supplying an amount of air corresponding to a required amount of electric power to the fuel cell 20 is performed at the time of normal generation of electric power in the fuel cell 20. The air compressor 33 is a device that compresses air and ejects air to the cathode-side flow passage of the fuel cell 20 via the oxidizing gas supply passage 31. The intercooler 34 causes the temperature of air which has risen due to compression by the air compressor 33 to fall. The pressure sensor 96 detects a pressure of air which flows in the oxidizing gas supply passage 31. The ON-OFF valve 44 is a valve that can cut off supply of an oxidizing gas to the fuel cell 20 in the oxidizing gas supply passage 31. The ON-OFF valve 44 is also referred to as a shutoff valve.

The oxidizing gas discharge passage 41 is a flow passage that guides the oxidizing exhaust gas discharged from the fuel cell 20 to the outside of the fuel cell system 100. The control valve 43 and the muffler 46 are provided in that order from upstream in the oxidizing gas discharge passage 41. A pressure (a back pressure) and a flow rate of an oxidizing gas in the fuel cell 20 can be changed by adjusting a degree of opening of the control valve 43. The fuel gas release passage 65 is connected to a position which is downstream from the control valve 43 in the oxidizing gas discharge passage 41. When the purge valve 66 is opened, water and gas discharged from the gas-liquid separator 62 are diluted with the oxidizing exhaust gas in the oxidizing gas discharge passage 41 and are discharged to the outside of the fuel cell system 100.

The bypass flow passage 37 is a flow passage that connects the oxidizing gas discharge passage 41 to a position which is upstream from the ON-OFF valve 44 in the oxidizing gas supply passage 31. The bypass valve 35 is provided in the bypass flow passage 37, and an oxidizing gas can flow through the bypass flow passage 37 when the bypass valve 35 is opened. The bypass valve 35 may be closed when the fuel cell 20 generates electric power. Alternatively, the bypass valve 35 may be configured as a flow rate adjusting valve that allows change of a flow rate depending on the degree of opening thereof and a part of air taken in by the air compressor 33 may be made to flow into the bypass flow passage 37 when the fuel cell 20 generates electric power. In this embodiment, the bypass valve 35 is temporarily closed when generation of electric power by the fuel cell 20 stops.

The refrigerant system 70 includes a radiator 72, a refrigerant pump 74, and a refrigerant flow passage 71. The refrigerant flow passage 71 is a flow passage that connects the radiator 72 to a refrigerant flow passage in the fuel cell 20 and circulates a refrigerant between the radiator 72 and the fuel cell 20. The radiator 72 includes a radiator fan 73 and cools a refrigerant flowing in the refrigerant flow passage 71. The refrigerant pump 74 generates a driving force for allowing a refrigerant to flow in the refrigerant flow passage 71.

The control unit 80 is constituted by a microcomputer and includes a CPU, a ROM, a RAM, and input and output ports. The control unit 80 controls generation of electric power in the fuel cell system 100 and controls the fuel-cell vehicle as a whole. The control unit 80 acquires output signals from sensors provided in constituent units of the fuel-cell vehicle (which include sensors provided in the constituent units of the fuel cell system 100, an accelerator operation amount sensor, a brake pedal sensor, a shift position sensor, and a vehicle speed sensor). The control unit 80 outputs drive signals to the units associated with generation of electric power, traveling, and the like in the fuel-cell vehicle. In this embodiment, the control unit 80 serves as a "flow passage control unit," a "wind speed deriving unit," a "temperature deriving unit," a "retention suppressing unit," and a "temperature rise control unit." The control unit 80 implementing the above-mentioned functions does not need to be constituted as a single control unit. For example, the control unit 80 may be constituted by a plurality of control units such as a control unit associated with the operation of the fuel cell system 100, a control unit associated with traveling of the fuel-cell vehicle, and a control unit that controls auxiliary machines of the vehicle not associated with traveling and required information may be exchanged between the plurality of control units.

In this embodiment, most of the constituent units of the fuel cell system 100 are disposed in a front compartment in the fuel-cell vehicle. A front compartment is a space which is provided in front of a passenger compartment and a dashboard in a fuel-cell vehicle. Specifically, most of the fuel gas system 50 other than the hydrogen tank 52, most of the oxidizing gas system 30 other than the downstream side in the oxidizing gas discharge passage 41 such as the muffler 46, and the refrigerant system 70 are disposed in the front compartment. The fuel cell system 100 is surrounded by an exterior panel on the front side of the vehicle and is disposed below the hood of the vehicle.

The fuel-cell vehicle in which the fuel cell system 100 according to this embodiment is mounted additionally includes a secondary battery (which is not illustrated) as a driving power source. The fuel-cell vehicle can travel using both the fuel cell 20 and the secondary battery as a driving power source and can also travel using only one of the fuel cell 20 and the secondary battery as a driving power source.

B. Configuration of Air Compressor

In the fuel cell system 100 according to this embodiment, a wind speed of wind which is received by the fuel cell system 100 is acquired using the air compressor 33. The configuration of the air compressor 33 will be described below before describing the operation of acquiring a wind speed.

Figure 2:
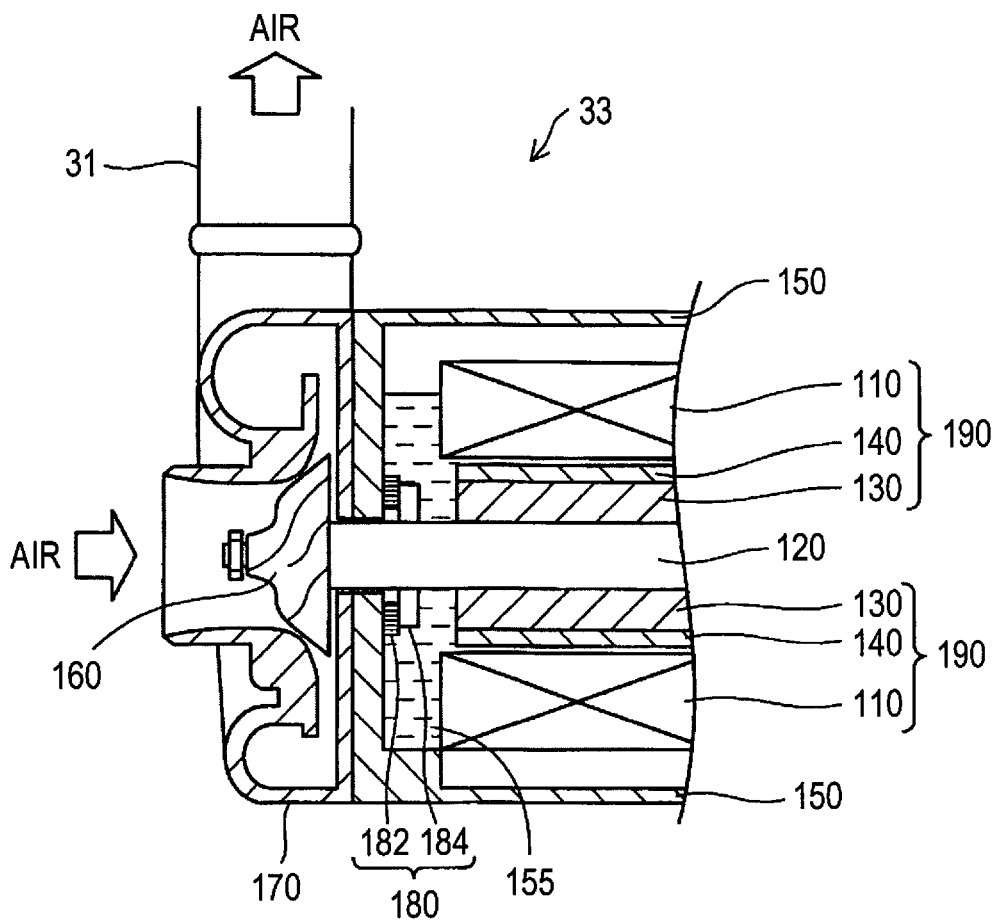
FIG. 2 is a sectional view schematically illustrating a configuration of an air compressor.

FIG. 2 is a sectional diagram schematically illustrating the configuration of the air compressor 33. The air compressor 33 includes a shaft 120, a rotating member 160 that is attached to the shaft 120, a rotating member accommodating section 170 that accommodates the rotating member 160, a motor 190 that drives the rotating member 160, and a motor accommodating section 150 that accommodates the motor 190. An impeller is used as the rotating member 160 in this embodiment, but another configuration may be employed. The motor 190 includes a solenoid 110, a rotor 130, and a magnet 140.

The motor accommodating section 150 is partially filled with an oil 155. The oil 155 circulates in the motor accommodating section 150 using a pump which is not illustrated. The air compressor 33 includes a mechanical seal 180 including a fixed ring 182 that is fixed to the motor accommodating section 150 and a rotary ring 184 that is fixed to the shaft 120 in order to suppress the oil 155 from permeating into the rotating member accommodating section 170 from the motor accommodating section 150. The air compressor 33 is a turbo compressor and has characteristics of good responsiveness due to its relatively small moment of inertia, lower power consumption at the time of starting activation than other types of air compressors, and high responsibility at the time of changing the rotation speed thereof. When the air compressor 33 stops, an upstream portion of the oxidizing gas supply passage 31 connected to the rotating member accommodating section 170 and a downstream portion of the oxidizing gas supply passage 31 connected to the rotating member accommodating section 170 are made to communicate with each other by the rotating member accommodating section 170.

C. Deriving of Wind Speed when Fuel-Cell Vehicle Stops

Figure 3:
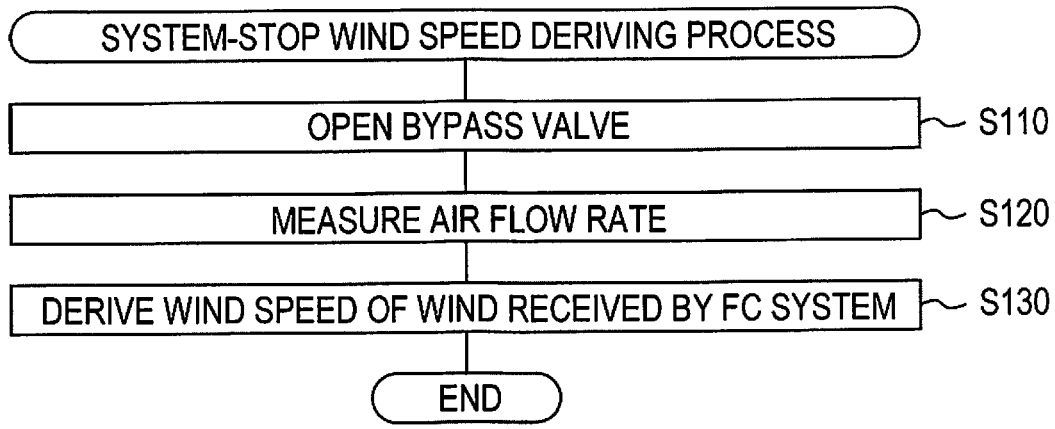
FIG. 3 is a flowchart illustrating a system-stop wind speed deriving process routine.

FIG. 3 is a flowchart illustrating a system-stop wind speed deriving process routine which is performed by the CPU of the control unit 80 when the fuel-cell vehicle and the fuel cell system 100 according to this embodiment are in a non-started state (a stopping state). This routine is performed as a wake-up process which is performed when the fuel-cell vehicle and the fuel cell system 100 are in the stopping state. That is, in the control unit 80 according to this embodiment, a wake-up timer is set when an ignition switch for inputting an instruction for ON and OFF of a starting state of the fuel-cell vehicle is turned off and the fuel cell system 100 is switched to the stopping state. Based on the measured time of the wake-up timer, the CPU of the control unit 80 is started and repeatedly performs the system-stop wind speed deriving process routine illustrated in FIG. 3 at intervals of a predetermined reference time. When the wake-up process is performed, generation of electric power of the fuel cell 20 is stopped and thus electric power required for the control unit 80 or the like is supplied form the secondary battery.

When this routine is started, the CPU of the control unit 80 outputs a drive signal to the bypass valve 35 and opens the bypass valve 35 (Step S110). The degree of opening of the bypass valve 35 in Step S110 can be set to a predetermined fixed value and it is preferable that the bypass valve 35 be fully opened from the viewpoint of suppression of a passage resistance in the bypass flow passage 37. The oxidizing gas supply passage 31 and the oxidizing gas discharge passage 41 communicate with each other via the bypass flow passage 37 by opening the bypass valve 35. As described above, an upstream portion and a downstream portion in the oxidizing gas supply passage 31 communicate with each other via the rotating member accommodating section 170 of the air compressor 33 in the air compressor 33. Accordingly, when the fuel cell system 100 receives wind after Step S110 has been performed, air with a flow rate corresponding to the wind speed of the received wind flows into the air compressor 33 and flows through the oxidizing gas supply passage 31, the bypass flow passage 37, and the oxidizing gas discharge passage 41. As described above, the air compressor 33 in this embodiment is disposed in the front compartment of the fuel-cell vehicle. When wind blows in a usage environment of the fuel-cell vehicle, wind from the front in the traveling direction of the vehicle flows mainly into the front compartment. Accordingly, the constituent units of the fuel cell system 100 disposed in the front compartment mainly receive wind from the front in the traveling direction of the vehicle. By opening the bypass valve 35 in Step S110, flowing of air due to wind from the front in the traveling direction of the vehicle is mainly caused via the air compressor 33.

In Step S110 in this embodiment, the CPU of the control unit 80 closes the ON-OFF valve 44. Accordingly, air flowing from the air compressor 33 flows in only the bypass flow passage 37 without passing through the inside of the fuel cell 20.

As described above, the air compressor 33 in this embodiment is disposed in the front compartment of the fuel-cell vehicle. Accordingly, in Step S110 of this embodiment, an operation of increasing the degree of opening of a grille shutter which is not illustrated (hereinafter including changing from a closed state to an open state) is additionally performed. A grille shutter is a structure for changing an amount of wind flowing into the front compartment (for example, running wind) and is disposed below a front bumper of a vehicle body. By increasing the degree of opening of the grille shutter, it is possible to increase a flow rate of wind flowing into the front compartment. By increasing the degree of opening of the grille shutter and increasing an amount of wind flowing into the front compartment, air can be more easily allowed to flow into the air compressor 33.

After Step S110, the CPU of the control unit 80 measures a flow rate of air flowing onto the oxidizing gas supply passage 31 via the air compressor 33 by acquiring a detection signal from the air flowmeter 95 (Step S120). In this embodiment, the air flowmeter 95 disposed upstream from the air compressor 33 is used to measure a flow rate of air flowing via the air compressor 33, but another configuration may be employed. For example, when a flow sensor is provided in the bypass flow passage 37 or the oxidizing gas discharge passage 41, the flow sensor may be used. When a flow sensor can measure a flow rate of air flowing into the oxidizing gas supply passage 31 via the air compressor 33 at the time of generation of electric power in the fuel cell 20, the flow sensor can be used in the same way as the air flowmeter 95. After Step S120, the CPU of the control unit 80 acquires a wind speed of wind which is received by the fuel cell system 100 using the flow rate of air measured in Step S120 (Step S130) and then ends this routine.

Figure 4:
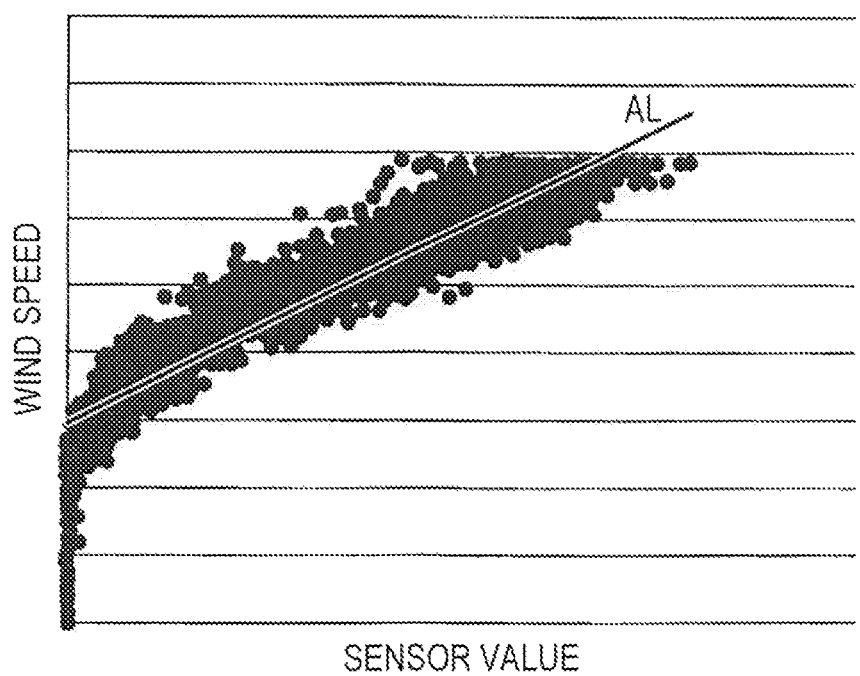
FIG. 4 is a diagram illustrating a relationship between a detected value from an air flowmeter and a wind speed.

FIG. 4 is a diagram illustrating a relationship between a detected value (a sensor value) of the air flowmeter 95 and a wind speed of wind which is received by the fuel cell system 100 in the fuel-cell vehicle according to this embodiment. In this embodiment, the sensor value is experimentally acquired in advance by fixing conditions of the fuel-cell vehicle (for example, including a degree of opening of the bypass valve 35 and a degree of opening of the grille shutter) and exposing the fuel-cell vehicle to the air at various wind speeds. An approximate curve (including an approximate straight line) AL indicating a relationship between the sensor value and the wind speed is acquired based on the acquired measurement results and is stored in a memory (also referred to as a storage unit) of the control unit 80. In FIG. 4, plot of measured values of the sensor values with respect to the wind speeds and an example of an approximate straight line indicating the relationship between the sensor values and the wind speeds are illustrated. In Step S130, the wind speed of wind which is received by the fuel cell system 100 is acquired based on the sensor values measured in Step S120 with reference to the approximate curve (including an approximate straight line) AL. As illustrated in FIG. 4, when the relationship between the wind speeds and the sensor values is acquired, the wind speed in the front compartment in which the fuel cell system 100 is installed is preferably used as the wind speed instead of the wind speed of wind applied to the fuel-cell vehicle. In this case, a wind gauge may be installed in the front compartment when the relationship is acquired.

In this embodiment, the CPU of the control unit 80 returns to a stopping state after having acquired the wind speed in Step S130 and having ended this routine, is started again when an elapsed time measured by the wake-up timer reaches a predetermined reference time thereafter, and performs the system-stop wind speed deriving process routine again.

With the fuel cell system 100 according to this embodiment having the above-mentioned configuration, the wind speed of wind which is received by the fuel cell system 100 can be acquired when the fuel-cell vehicle and the fuel cell system 100 are in the non-started state by acquiring a flow rate of air flowing from the oxidizing gas supply passage 31 to the oxidizing gas discharge passage 41 via the air compressor 33 and the bypass flow passage 37 when the air compressor 33 stops. Accordingly, it is possible to acquire the wind speed of wind which is received by the fuel cell system 100 without complicating the structure by providing a separate wind speed sensor. Particularly, in this embodiment, since the air flowmeter 95 for measuring a flow rate of air at the time of generation of electric power in the fuel cell 20 is used to measure a flow rate of air at the time of stopping of the air compressor 33, it is possible to suppress complication of the structure due to measurement of a flow rate of air.

In Step S110 of this embodiment, the bypass valve 35 is opened and the ON-OFF valve 44 is closed, but the ON-OFF valve 44 may not be closed. When a wind speed is acquired, a part of air flowing via the air compressor 33 may be guided to the cathode-side flow passage in the fuel cell 20 by opening the ON-OFF valve 44. Here, when liquid water or the like retains in the cathode-side flow passage in the fuel cell 20, a pressure loss when air flows in the cathode-side flow passage may increase and the flow rate of air flowing via the air compressor 33 may change. Accordingly, from the viewpoint of improvement in accuracy for acquiring a wind speed, it is preferable that the ON-OFF valve 44 be closed in Step S110.

D. Deriving of Wind Speed at the Time of Traveling

Figure 5:
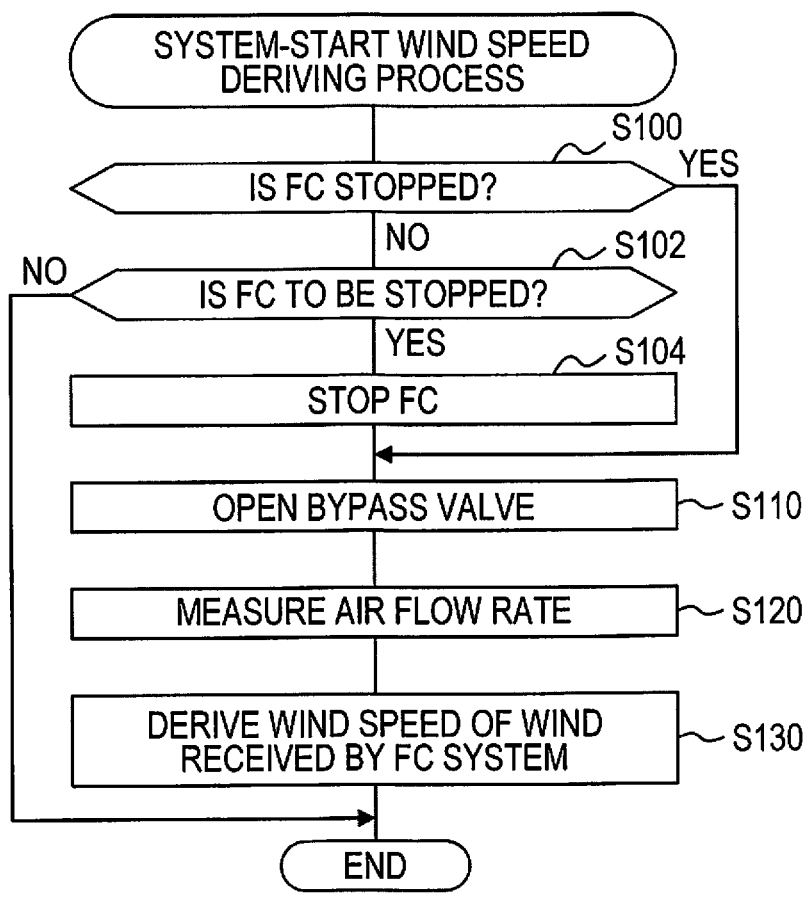
FIG. 5 is a flowchart illustrating a system-start wind speed deriving process routine.

FIG. 5 is a flowchart illustrating a system-start wind speed deriving process routine which is performed by the CPU of the control unit 80 when the fuel-cell vehicle and the fuel cell system 100 according to this embodiment are in the started state. This routine is repeatedly performed after an ignition switch for inputting an instruction for ON and OFF of a starting state of the fuel-cell vehicle is turned on.

When this routine is started, the CPU of the control unit 80 determines whether the fuel cell 20 stops generation of electric power (Step S100). Whether the fuel cell 20 stops generation of electric power can be determined, for example, based on a detection signal from a current sensor or a voltage sensor which is disposed in a wire for connecting the fuel cell 20 to a drive motor (not illustrated) or the secondary battery in the fuel-cell vehicle. Examples of the case in which the fuel cell 20 stops generation of electric power include a case in which the fuel-cell vehicle stops temporarily and a case in which the fuel-cell vehicle travels using only the secondary battery mounted in the fuel-cell vehicle as a driving power source.

When the fuel cell 20 is generating electric power (NO in Step S100), the CPU of the control unit 80 determines whether generation of electric power in the fuel cell 20 is to be stopped (Step S102). When the fuel-cell vehicle is traveling and, for example, a state of charge (SOC) of the secondary battery is equal to or greater than a reference value at which it can be determined that the fuel-cell vehicle can travel using the secondary battery as a single driving power source, it is determined that generation of electric power in the fuel cell 20 is to be stopped. When the secondary battery is being charged using the fuel cell 20, it may be determined that generation of electric power in the fuel cell 20 is not to be stopped until the SOC of the secondary battery reaches a predetermined reference value. Alternatively, when a certain process with priority is being performed by generation of electric power in the fuel cell 20, it may be determined that generation of electric power in the fuel cell 20 is not to be stopped.

When it is determined in Step S102 that generation of electric power in the fuel cell 20 is not to be stopped (NO in Step S102), the CPU of the control unit 80 ends this routine. When it is determined in Step S102 that generation of electric power in the fuel cell 20 is to be stopped (YES in Step S102), the CPU of the control unit 80 stops generation of electric power in the fuel cell 20 (Step S104). As a result, the air compressor 33 is also stopped.

After generation of electric power in the fuel cell 20 has been stopped in Step S104 or after it is determined in Step S100 that the fuel cell 20 stops generation of electric power (YES in Step S100), the CPU of the control unit 80 performs the same steps S110 to S130 as in the system-stop wind speed deriving process illustrated in FIG. 3 and then ends this routine. Accordingly, the wind speed of wind which is received by the fuel cell system 100 when the fuel-cell vehicle and the fuel cell system 100 are in the started state is acquired.

With the fuel cell system 100 according to this embodiment having the above-mentioned configuration, the wind speed of wind which is received by the fuel cell system 100 when the fuel-cell vehicle and the fuel cell system 100 are in the started state can be derived by acquiring the flow rate of air flowing from the oxidizing gas supply passage 31 to the oxidizing gas discharge passage 41 via the air compressor 33 and the bypass flow passage 37 when the air compressor 33 stops. Accordingly, it is possible to derive a wind speed of wind which is received by the fuel cell system 100 without complicating the structure by providing a separate wind speed sensor.

When the fuel-cell vehicle is traveling, for example, when the fuel-cell vehicle is traveling using only the secondary battery as a driving power source, the wind speed derived as described above has a value which is acquired by summing a wind speed of wind blowing in an environment in which the fuel-cell vehicle is traveling (hereinafter also referred to as an environmental wind speed) and a wind speed of running wind which is caused due to traveling of the vehicle.

E. Processes of Deriving Temperatures of Constituent Units and Suppressing a Retention of Liquid Water in Fuel Cell System Using Wind Speed In the fuel cell system 100 according to this embodiment, temperatures of constituent units of the fuel cell system 100 are measured. When a temperature sensor is provided for each of the constituent units such as devices, components, and pipes of which a temperature is to be measured, the number of components increases, the structure is complicated, and the costs increase. Accordingly, in this embodiment, the temperatures of the constituent units are acquired using a value of an outside air temperature detected by the outside air temperature sensor 36 provided in the fuel-cell vehicle.

In the fuel cell system 100, various controls are performed using the temperatures of the constituent units acquired as described above. In the following description, an operation of deriving a temperature of a constituent unit and a process of suppressing a retention of liquid water in the constituent unit as an example of control using the temperature of the constituent unit will be described below.

Figure 6:
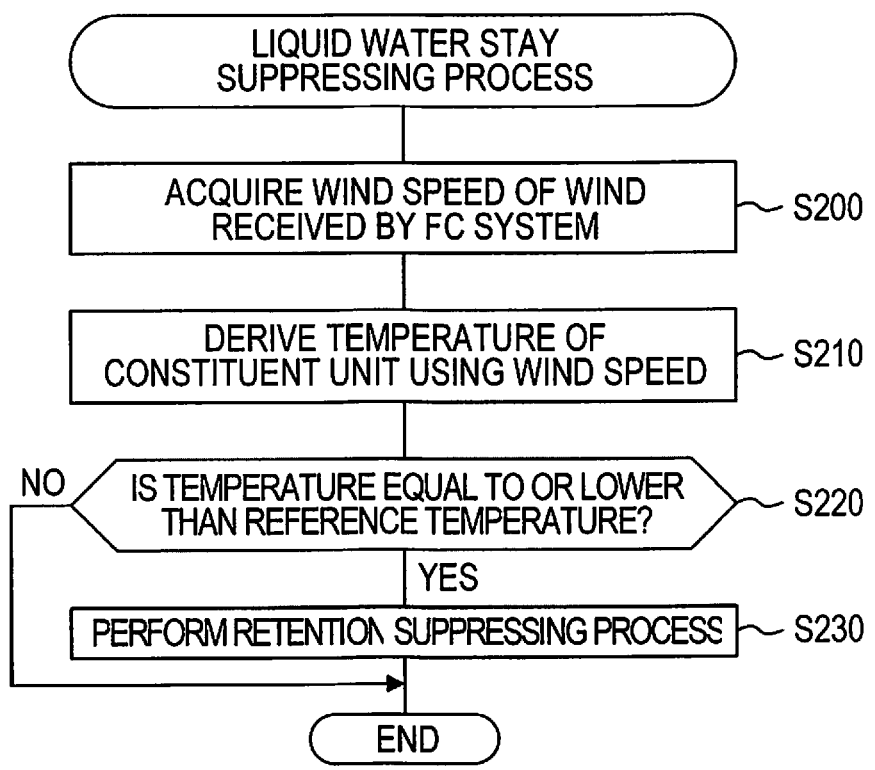
FIG. 6 is a flowchart illustrating a liquid water retention suppressing process routine.

FIG. 6 is a flowchart illustrating a liquid water retention suppressing process routine which is performed by the CPU of the control unit 80. This routine is repeatedly performed after the ignition switch of the fuel-cell vehicle has been turned on. When the fuel-cell vehicle and the fuel cell system 100 are in the stopping state and the wake-up process is performed, this routine is performed along with the process of deriving a wind speed.

When this routine is started, the CPU of the control unit 80 acquires a wind speed of wind which is received by the fuel cell system 100 (Step S200). In this embodiment, when the wind speed is derived by the wind speed deriving process illustrated in FIGS. 3 and 5, the derived wind speed is temporarily stored in a memory of the control unit 80. In Step S200, the CPU of the control unit 80 calls the latest wind speed derived by the wind speed deriving process illustrated in FIGS. 3 and 5 from the memory. Thereafter, the CPU of the control unit 80 derives temperatures of the constituent units of the fuel cell system 100 using the wind speed acquired in Step S200 (Step S210). The operation of deriving the temperatures of the constituent units using the wind speed which is performed in Step S210 will be described below.

For example, when a certain time elapses after the fuel cell system 100 has stopped, the temperatures of the constituent units of the fuel cell system 100 are almost the same as the environmental temperature (the temperature detected by the outside air temperature sensor 36). Thereafter, when the fuel cell system 100 is started and generation of electric power in the fuel cell 20 is started, the fuel cell 20 emits heat and thus the temperatures rise. With this temperature rise, the temperatures of the constituent units of the fuel cell system 100 which are arranged around the fuel cell 20 rise due to transmission of heat from the fuel cell 20 serving as a heat source. A rising temperature per unit time $\Delta T_U$ of each constituent unit due to transmission of heat from the fuel cell 20 can be expressed by Equation (1).

$$\Delta T_U = \text{heat receiving coefficient} \times (\text{fuel cell temperature} - \text{temperature of constituent unit}) \quad (1)$$

In Equation (1), the fuel cell temperature can be acquired as a temperature of a refrigerant flowing in the refrigerant flow passage 71 of the refrigerant system 70 when the fuel cell 20 generates electric power. When generation of electric power in the fuel cell 20 stops, the fuel cell temperature can be calculated by integrating a temperature fall derived from a falling temperature per unit time $\Delta T_D$ due to dissipation of heat using the temperature of the fuel cell 20 (the refrigerant temperature) when generation of electric power in the fuel cell 20 is stopped as an initial value. The falling temperature per unit time $\Delta T_D$ will be described later. In Equation (1), a temperature of a constituent unit can be set to the temperature of the constituent unit which has been acquired in a previous cycle out of cycles in which the operation of acquiring the temperature of the constituent unit is repeated. The heat receiving coefficient is a value which is mainly determined by the fuel cell temperature, a temperature difference between the fuel cell temperature and the temperature of the constituent unit, and a heat capacity of a member constituting a path through which heat is transmitted from the fuel cell to the constituent unit. For example, the heat receiving coefficient may be experimentally acquired in advance for each constituent unit and may be stored in the memory of the control unit 80 as a map having the fuel cell temperature and the temperature difference between the fuel cell temperature and the temperature of the constituent unit as parameters.

Each constituent unit rises in temperature due to transmission of heat and falls in temperature due to dissipation of heat as described above. The falling temperature per unit time $\Delta T_D$ of each constituent unit due to dissipation of heat can be expressed by Equation (2).

$$\Delta T_D = \text{heat loss coefficient} \times (\text{temperature of constituent unit} - \text{outside air temperature}) \quad (2)$$

In Equation (2), the temperature of the constituent unit is the same as in Equation (1). The outside air temperature is a temperature which is detected by the outside air temperature sensor 36. The heat loss coefficient is a value which is mainly determined by the temperature of the constituent unit and a temperature difference between the temperature of the constituent unit and the outside air temperature. The temperature of the constituent unit falls more greatly when the constituent unit (the fuel cell system 100) receives wind. Accordingly, in this embodiment, the heat loss coefficient is set in additional consideration of the wind speed of wind which is received by the constituent unit (the fuel cell system 100). For example, the heat loss coefficient may be experimentally acquired in advance for each constituent unit and may be stored in the memory of the control unit 80 as a map having the temperature of the constituent unit, the temperature difference between the temperature of the constituent unit and the outside air temperature, and the wind speed of wind which is received by the fuel cell system 100 as parameters. When the falling temperature per unit time $\Delta T_D$ of a constituent unit is acquired, a value which is acquired using a flow rate of air flowing via the air compressor 33 when the generation of electric power in the fuel cell 20 is stopped is used as the wind speed of wind which is received by the fuel cell system 100 as described above.

The temperature of a constituent unit rises or falls depending on a difference between the rising temperature per unit time $\Delta T_U$ and the falling temperature per unit time $\Delta T_D$. That is, the difference between the rising temperature per unit time $\Delta T_U$ and the falling temperature per unit time $\Delta T_D$ is a rate of change of the temperature of the constituent unit. Accordingly, in Step S210, by adding the rate of change of the temperature and a change in temperature which is derived from the cycle time of the temperature deriving process to the temperature of the constituent unit acquired in the previous cycle and repeating the operation of calculating the current temperature of the constituent unit, it is possible to calculate the temperature of the constituent unit over time without providing a temperature sensor in the constituent unit.

After the temperature of the constituent unit has been derived in Step S210, the CPU of the control unit 80 compares the derived temperature of the constituent unit with a reference temperature which is set in advance and stored in the memory of the control unit 80 (Step S220). The reference temperature is determined as a reference for determining whether a liquid water retention suppressing process which will be described later is to be performed for each constituent unit.

When it is determined in Step S220 that the temperature of the constituent unit is equal to or lower than the reference value (YES in Step S220), the CPU of the control unit 80 performs a retention suppressing process for suppressing a retention of liquid water in the constituent unit (Step S230) and then ends this routine. When it is determined in Step S220 that the temperature of the constituent unit is higher than the reference value (NO in Step S220), the CPU of the control unit 80 does not perform the retention suppressing process but ends this routine. In the following description, the retention suppressing process which is performed for each constituent unit will be described.

When the constituent unit is the fuel cell 20, the temperature of the fuel cell 20 after generation of electric power is stopped can be calculated by integrating a temperature fall acquired from the falling temperature per unit time $\Delta T_D$ using the temperature of the fuel cell 20 when the generation of electric power is stopped as an initial value as described above. When the temperature of the fuel cell 20 is equal to or lower than a predetermined reference temperature, a scavenging process is performed as the retention suppressing process. Specifically, for example, the CPU of the control unit 80 may scavenge the pipes of an oxidizing gas and remove moisture in the pipes by driving the air compressor 33. Alternatively, the CPU of the control unit 80 may scavenge the pipes of a fuel gas and remove moisture in the pipes by driving the injector 55 or the fuel gas pump 64. By performing such a scavenging process, it is possible to suppress a retention of liquid water in a gas flow passage in the fuel cell 20 and to suppress dew condensation or freezing in the gas flow passage.

When the constituent unit is the fuel gas pump 64 and the temperature of the fuel gas pump 64 is equal to or lower than a predetermined reference temperature, it is possible to suppress a retention of liquid water in the fuel gas pump 64 and to suppress dew condensation or freezing by driving the fuel gas pump 64.

Alternatively, when generation of electric power in the fuel cell 20 is stopped and the temperature of a constituent unit becomes equal to or lower than a predetermined reference temperature, the CPU of the control unit 80 may heat the constituent unit by temporarily performing generation of electric power in the fuel cell 20. When the constituent unit such as the fuel cell 20, the fuel gas pump 64, or a pipe of fluid connected to the fuel cell 20 is affected by emission of heat from the fuel cell 20, it is possible to cause the temperature of the constituent unit to rise by causing the fuel cell 20 to emit heat.

When the constituent unit is separated from the fuel cell 20, the falling temperature per unit time $\Delta T_D$ is greater than the rising temperature per unit time $\Delta T_U$ during generation of electric power in the fuel cell 20, for example, during traveling of the fuel-cell vehicle, and thus the temperature of the constituent unit may be equal to or lower than the reference temperature. In this case, the constituent unit may be heated by temporarily increasing an amount of heat emitted from the fuel cell 20. The CPU of the control unit 80 may achieve thermal insulation of the constituent unit disposed in the front compartment by closing the grille shutter. In this way, by heating the constituent unit or achieving thermal insulation, it is possible to suppress a retention of liquid water in the constituent unit and to suppress dew condensation or freezing in the constituent unit.

In the fuel cell system 100 according to this embodiment having the above-mentioned configuration, since the falling temperature per unit time $\Delta T_D$ of a constituent unit is acquired using the wind speed of wind which is received by the fuel cell system 100 and the temperature of the constituent unit is calculated, it is possible to accurately derive the temperature of a constituent unit without complicating the structure. Since when the retention suppressing process is to be performed is determined using the derived temperature of the constituent unit, it is possible to appropriately perform the retention suppressing process without complicating the structure of the fuel cell system 100.

When the process of calculating a temperature of a constituent unit is continuously performed during traveling of the fuel-cell vehicle, a state in which generation of electric power in the fuel cell 20 is not to be stopped may be maintained and thus a state in which a wind speed is not to be derived may be maintained in Step S102. In this case, the falling temperature per unit time $\Delta T_D$ may be calculated and the temperature of the constituent unit may be calculated using the latest value of the wind speed acquired through the previous system-start wind speed deriving process until the wind speed can be derived in the next time. The outline of the specific operation thereof is as follows.

That is, while the fuel-cell vehicle is traveling, the wind speed derived in Step S130 has a value which is acquired by adding the environmental wind speed and a wind speed of running wind due to traveling of the vehicle. The wind speed of running wind can be acquired using a vehicle speed of the fuel-cell vehicle. Specifically, a relationship between the vehicle speed of the fuel-cell vehicle and the wind speed of running wind due to traveling (the vehicle speed) can be experimentally acquired and stored in the control unit 80 in advance. The environmental wind speed can be acquired by acquiring the current wind speed of running wind using the current vehicle speed with reference to the relationship and subtracting the acquired wind speed from the wind speed acquired in Step S130. Thereafter, when the wind speed is not newly acquired in Step S130, the wind speed of wind which is received by the fuel cell system 100 can be set to a value which is acquired by adding the environmental wind speed to the wind speed of running wind acquired from the vehicle speed at that time.

When the fuel-cell vehicle and the fuel cell system 100 are in the stopped state, the wind speed of wind which is received by the fuel cell system 100 is derived through the above-mentioned wake-up process and the temperatures of the constituent units are derived. At this time, for example, when the state of charge (SOC) of the secondary battery mounted in the fuel-cell vehicle is not sufficient, the wake-up process may not be performed. In this case, the temperatures of the constituent units cannot be derived in consideration of the wind speed and thus it is difficult to perform the process of suppressing a retention of liquid water in the constituent units based on the derived temperatures. In this case, a predetermined fail-safe process can be performed. Specifically, at a time at which a retention of liquid water in the constituent units can be suppressed even in the strictest conditions which are predictable, a process such as the above-mentioned scavenging process may be performed.

F. Example of Other Control Using Wind Speed

A process other than the process of deriving the temperatures of the constituent units of the fuel cell system 100 may be performed using the wind speed acquired in Step S130. For example, when the fuel-cell vehicle receives wind from the front in the traveling direction thereof, running resistance is generated. Accordingly, when a relationship between the wind speed acquired in Step S130 and the running resistance generated in the fuel-cell vehicle is acquired in advance, the running resistance generated in the fuel-cell vehicle can be derived using the wind speed acquired in Step S130. In this case, when a required amount of generated power is set for the fuel cell 20 based on an accelerator operation amount, the required amount of generated power can be corrected such that the required amount of generated power increases as the derived running resistance increases. Accordingly, it is possible to perform control for obtaining a feeling of acceleration corresponding to the accelerator operation amount.

In the fuel cell system 100, an amount of driving of the air compressor 33 when gas including water and hydrogen is discharged from the gas-liquid separator 62 is increased by opening the purge valve 66. Accordingly, since a flow rate of an oxidizing exhaust gas flowing in the oxidizing gas discharge passage 41 increases, hydrogen discharged via the purge valve 66 is more easily diluted. At this time, as the wind speed of wind which is received by the fuel cell system 100 increases, hydrogen discharged via the purge valve 66 is more easily diluted. Accordingly, when the wind speed acquired in Step S130 is equal to or higher than a predetermined reference value, it is possible to perform control such that a degree of increasing in the amount of driving of the air compressor 33 when the purge valve 66 is opened is decreased.

G. Other Embodiments

In the above-mentioned embodiment, a so-called turbo compressor illustrated in FIG. 2 is used as the air compressor 33, but other configurations may be employed. The air compressor is not particularly limited as long as an inlet and an outlet of the air compressor do not have air-tightness, an upstream part and a downstream part of the oxidizing gas supply passage connected to the air compressor communicate with each other when the air compressor stops, and a flow rate of air corresponding to the wind speed of wind which is received by the fuel cell system 100 can flow thereinto. The air compressor may be, for example, a reciprocating compressor instead of the turbo compressor and a reciprocating compressor can be used in the same way as long as it does not have air-tightness.

In the above-mentioned embodiment, as illustrated in FIG. 4, a relationship between a flow rate of air flowing via the air compressor 33 and the bypass flow passage 37 when the air compressor 33 stops and the wind speed of wind which is received by the fuel cell system 100 is stored in advance and the wind speed of wind which is received by the fuel cell system 100 is derived using the relationship, but other configurations may be employed. For example, the wind speed may be derived by ascertaining an intensity level of the wind speed of wind which is received by the fuel cell system 100 step by step using a detected value from a flow sensor (the air flowmeter 95). Depending on the intensity level of the derived wind speed, for example, correction of the required amount of generated power when the vehicle is traveling or correction of the amount of driving of the air compressor 33 when the purge valve 66 is opened may be performed.

The fuel cell system 100 may be used as a driving power source of a moving object other than a vehicle in addition to a driving power source of a vehicle. Alternatively, the fuel cell system 100 may be a stationary power generator. For example, when even a stationary power generator receives wind, a degree of decrease in temperature of each constituent unit increases and thus the same control can be performed on the temperatures of the constituent units. Alternatively, control of increasing the amount of driving of the air compressor 33 when the purge valve 66 is opened can be performed in the same way. Unlike the fuel cell system 100 described in the embodiment, the fuel cell system may be greatly affected by wind which blows in a direction other than a specific direction such as a direction from the front in the traveling direction of the vehicle. In this case, wind in various directions can be made to flow into the oxidizing gas supply passage 31, for example, depending on a shape of an intake port of the oxidizing gas supply passage 31 or the like.

The disclosure is not limited to the above-mentioned embodiment and can be embodied in various forms without departing from the gist of the disclosure. For example, technical features of the aspects described in the SUMMARY can be appropriately exchanged or combined to solve a part or all of the above-mentioned problems or to achieve a part or all of the above-mentioned advantages. The technical features can be appropriately deleted as long as they are not described as being essential in this specification.

What is claimed is:

1. A fuel cell system comprising:
a fuel cell;
an oxidizing gas supply passage that is connected to the fuel cell and in which air supplied to the fuel cell flows;
an oxidizing gas discharge passage that is connected to the fuel cell and in which an oxidizing exhaust gas discharged from the fuel cell flows;
a compressor that is provided in the oxidizing gas supply passage and is configured to discharge air to the fuel cell, an upstream portion of the oxidizing gas supply passage and a downstream portion of the oxidizing gas supply passage communicating with each other via the compressor when the compressor stops, the upstream portion being upstream of the compressor and the downstream portion being downstream of the compressor;
a bypass flow passage that connects a portion downstream from a position at which the compressor is disposed in the oxidizing gas supply passage to the oxidizing gas discharge passage;
a flow sensor configured to measure an actual flow rate of air which is introduced into the oxidizing gas supply passage via the compressor when the fuel cell generates electric power;
a wind speed deriving unit configured to acquire the measured actual flow rate of air in a state in which air flows from the oxidizing gas supply passage to the oxidizing gas discharge passage via the compressor and the bypass flow passage and to derive an actual wind speed of wind which is received by the fuel cell system, when the compressor stops; and
a storage unit which stores, in advance, a relationship between a flow rate of air flowing from the oxidizing gas supply passage to the oxidizing gas discharge passage via the compressor and the bypass flow passage when the compressor stops and a wind speed of wind which is received by the fuel cell system,
wherein the wind speed deriving unit is configured to derive the actual wind speed of wind which is received by the fuel cell system using the acquired measured actual flow rate of air and the stored relationship.

2. A fuel cell system comprising:
a fuel cell;
an oxidizing gas supply passage that is connected to the fuel cell and in which air supplied to the fuel cell flows;
an oxidizing gas discharge passage that is connected to the fuel cell and in which an oxidizing exhaust gas discharged from the fuel cell flows;
a compressor that is provided in the oxidizing gas supply passage and is configured to discharge air to the fuel cell, an upstream portion of the oxidizing gas supply passage and a downstream portion of the oxidizing gas supply passage communicating with each other via the compressor when the compressor stops, the upstream portion being upstream of the compressor and the downstream portion being downstream of the compressor;
a bypass flow passage that connects a portion downstream from a position at which the compressor is disposed in the oxidizing gas supply passage to the oxidizing gas discharge passage;
a flow sensor configured to measure an actual flow rate of air which is introduced into the oxidizing gas supply passage via the compressor when the fuel cell generates electric power;
a wind speed deriving unit configured to acquire the measured actual flow rate of air in a state in which air flows from the oxidizing gas supply passage to the oxidizing gas discharge passage via the compressor and the bypass flow passage and to derive an actual wind speed of wind which is received by the fuel cell system, when the compressor stops;

a temperature deriving unit configured to derive a temperature of a constituent unit of the fuel cell system using the derived actual wind speed; and a retention suppressing unit configured to perform a process of suppressing a retention of liquid water in the constituent unit using the derived temperature of the constituent unit.

3. The fuel cell system according to claim 2, wherein the constituent unit includes the fuel cell, the temperature deriving unit is configured to derive a temperature of the fuel cell, the retention suppressing unit is configured to scavenge the oxidizing gas supply passage and the oxidizing gas discharge passage by driving the compressor when the derived temperature of the fuel cell is equal to or lower than a predetermined reference temperature.

4. The fuel cell system according to claim 2, further comprising:

a fuel gas supply passage in which a fuel gas supplied to the fuel cell flows;

a fuel gas discharge passage in which a fuel gas discharged from the fuel cell flows;

a fuel gas circulation passage that is connected to the fuel gas supply passage and the fuel gas discharge passage;

an injector that is disposed in the fuel gas supply passage; and a fuel gas pump that is disposed in the fuel gas circulation passage, wherein the constituent unit includes the fuel cell, the temperature deriving unit is configured to derive a temperature of the fuel cell, the retention suppressing unit is configured to scavenge the fuel gas supply passage, the fuel gas discharge passage, and the fuel gas circulation passage by driving the injector and the fuel gas pump when the derived temperature of the fuel cell is equal to or lower than a predetermined reference temperature.

5. The fuel cell system according to claim 2, further comprising:

a fuel gas supply passage in which a fuel gas supplied to the fuel cell flows;

a fuel gas discharge passage in which a fuel gas discharged from the fuel cell flows;

a fuel gas circulation passage that is connected to the fuel gas supply passage and the fuel gas discharge passage;

a fuel gas pump that is disposed in the fuel gas circulation passage; and a gas-liquid separator that is disposed in the fuel gas discharge passage and separates water from the fuel gas discharged from the fuel cell, wherein the constituent unit includes the fuel gas pump, the temperature deriving unit is configured to derive a temperature of the fuel gas pump, the retention suppressing unit is configured to drive the fuel gas pump when the derived temperature of the fuel gas pump is equal to or lower than a predetermined reference temperature.

6. The fuel cell system according to claim 1, further comprising:

a temperature deriving unit configured to derive a temperature of a constituent unit of the fuel cell system using the derived actual wind speed;

a fuel gas passage that is connected to the fuel cell; and a temperature rise control unit configured to cause the fuel cell to generate electric power when the derived temperature of the constituent unit is equal to or lower than a predetermined reference temperature while power generation of the fuel cell is stopped, wherein the constituent unit includes at least one of a fuel gas pump that is disposed in the fuel gas passage, the oxidizing gas supply passage, and the oxidizing gas discharge passage.

7. The fuel cell system according to claim 1, wherein the compressor is a turbo compressor.

8. A fuel cell system comprising:

a fuel cell;

an oxidizing gas supply passage that is connected to the fuel cell and in which air supplied to the fuel cell flows;

an oxidizing gas discharge passage that is connected to the fuel cell and in which an oxidizing exhaust gas discharged from the fuel cell flows;

a compressor that is provided in the oxidizing gas supply passage and is configured to discharge air to the fuel cell, an upstream portion of the oxidizing gas supply passage and a downstream portion of the oxidizing gas supply passage communicating with each other via the compressor when the compressor stops, the upstream portion being upstream of the compressor and the downstream portion being downstream of the compressor;

a bypass flow passage that connects a portion downstream from a position at which the compressor is disposed in the oxidizing gas supply passage to the oxidizing gas discharge passage;

a flow sensor configured to measure an actual flow rate of air which is introduced into the oxidizing gas supply passage via the compressor when the fuel cell generates electric power;

a wind speed deriving unit configured to acquire the measured actual flow rate of air in a state in which air flows from the oxidizing gas supply passage to the oxidizing gas discharge passage via the compressor and the bypass flow passage and to derive an actual wind speed of wind which is received by the fuel cell system, when the compressor stops;

a bypass valve that is disposed in the bypass flow passage;

a shutoff valve that is disposed in the oxidizing gas supply passage at a position downstream from a connection part at which the bypass flow passage is connected to the oxidizing gas supply passage; and a flow passage control unit configured to close the shutoff valve to cut off flow of air into the fuel cell and to open the bypass valve such that the air flows in the bypass flow passage, when the wind speed deriving unit derives the actual wind speed.

9. A moving object comprising the fuel cell system according to claim 1.

10. The moving object according to claim 9, wherein the moving object is a fuel cell vehicle, and wherein the fuel cell system is disposed in a front compartment of the fuel cell vehicle.

11. A wind speed deriving method in a fuel cell system including a fuel cell, comprising:

causing at least a part of air flowing in a compressor to bypass the fuel cell and measuring an actual flow rate of air flowing in the compressor, when the compressor that supplies air as an oxidizing gas to the fuel cell stops;

deriving an actual wind speed of wind which is received by the fuel cell system using a relationship between a flow rate of air flowing in the compressor when the compressor stops and a wind speed of wind which is received by the fuel cell system which is stored in advance in a storage unit and the measured actual flow rate of air; and storing in a storage unit, in advance, a relationship between a flow rate of air flowing from the oxidizing gas supply passage to the oxidizing gas discharge passage via the compressor and the bypass flow passage when the compressor stops and a wind speed of wind which is received by the fuel cell system, wherein the deriving step derives the actual wind speed of wind which is received by the fuel cell system using the acquired measured actual flow rate of air and the stored relationship.

12. A wind speed deriving method in a fuel cell system including a fuel cell, comprising:

causing at least a part of air flowing in a compressor to bypass the fuel cell and measuring an actual flow rate of air flowing in the compressor, when the compressor that supplies air as an oxidizing gas to the fuel cell stops; and deriving an actual wind speed of wind which is received by the fuel cell system using a relationship between a flow rate of air flowing in the compressor when the compressor stops and a wind speed of wind which is received by the fuel cell system which is stored in advance in a storage unit and the measured actual flow rate of air;

deriving a temperature of a constituent unit of the fuel cell system using the derived actual wind speed; and suppressing a retention of liquid water in the constituent unit using the derived temperature of the constituent unit.

13. A wind speed deriving method in a fuel cell system including a fuel cell, comprising:

causing at least a part of air flowing in a compressor to bypass the fuel cell and measuring an actual flow rate of air flowing in the compressor, when the compressor that supplies air as an oxidizing gas to the fuel cell stops;

deriving an actual wind speed of wind which is received by the fuel cell system using a relationship between a flow rate of air flowing in the compressor when the compressor stops and a wind speed of wind which is received by the fuel cell system which is stored in advance in a storage unit and the measured actual flow rate of air;

closing a shutoff valve disposed in an oxidizing gas supply passage at a position downstream from a connection part at which the bypass flow passage is connected to the oxidizing gas supply passage to cut off flow of air into the fuel cell; and opening a bypass valve disposed in a bypass flow passage that bypasses the fuel cell such that the air flows in the bypass flow passage, when the wind speed deriving unit derives the actual wind speed.

* * * * *